United States Patent [19]
Basu et al.

[11] Patent Number: 6,097,733
[45] Date of Patent: Aug. 1, 2000

[54] SYSTEM AND ASSOCIATED METHOD OF OPERATION FOR MANAGING BANDWIDTH IN A WIRELESS COMMUNICATION SYSTEM SUPPORTING MULTIMEDIA COMMUNICATIONS

[75] Inventors: Kalyan K. Basu, Plano; Carlos A. Molina, Dallas, both of Tex.

[73] Assignee: Nortel Networks Corporation, Ottawa, Canada

[21] Appl. No.: 08/876,192

[22] Filed: Jun. 13, 1997

[51] Int. Cl.[7] .................................................. H04Q 7/34
[52] U.S. Cl. .................. 370/468; 370/329; 370/338; 370/341; 370/521; 455/452; 455/561; 455/560
[58] Field of Search ...................... 370/328, 329, 370/341, 465, 468, 521, 335, 336, 337, 338, 342, 345, 347, 441, 442, 437, 474, 479, 477; 455/422, 450, 452, 507, 509, 517, 550, 560, 561

[56] References Cited

U.S. PATENT DOCUMENTS

| | | | |
|---|---|---|---|
| 5,590,127 | 12/1996 | Bales et al. | 370/468 |
| 5,613,198 | 3/1997 | Ahmadi et al. | 370/648 |
| 5,625,877 | 4/1997 | Dunn et al. | 370/329 |
| 5,751,712 | 5/1998 | Farwell et al. | 370/468 |
| 5,818,830 | 10/1998 | Daane et al. | 370/347 |
| 5,914,945 | 6/1999 | Abu-Amara et al. | 370/329 |

*Primary Examiner*—Ricky Ngo
*Attorney, Agent, or Firm*—Bruce Garlick

[57] ABSTRACT

A communication system provides wireless voice and multimedia communications and includes a base station, a plurality of wireless mobile units and a bandwidth allocator. The base station provides wireless coverage throughout a service area and has a bandwidth for providing the wireless coverage. The plurality of wireless mobile units operate within the service area and communicate with the base station to transmit and receive both voice communications and multimedia communications. The bandwidth allocator selectively allocates the bandwidth in response to wireless multimedia communication requirements to achieve a minimum transmission rate for multimedia communications. The communication system may include a plurality of channels, each having a channel bandwidth with the bandwidth allocator selectively allocating the channels in response to the multimedia communication requirements to achieve the minimum transmission rate. The base station may also include a plurality of data modems, each of the data modems providing a respective portion of the bandwidth, the bandwidth allocator selectively allocating the plurality of data modems of the base station to achieve the minimum transmission rate. Further, at least one of the wireless mobile units may include a plurality of data modems with the bandwidth allocator selectively allocating the data modems of the wireless mobile unit to achieve the minimum transmission rate. In such case, each of the of the plurality of modems may be assigned a channel. In some constructions, the bandwidth allocator may allocate time divisions of the plurality of channels bandwidth while in other constructions may allocate allocating code divisions of the bandwidth to achieve the minimum transmission rate.

36 Claims, 10 Drawing Sheets

SYSTEM AND ASSOCIATED METHOD OF OPERATION FOR MANAGING BANDWIDTH IN A WIRELESS COMMUNICATION SYSTEM SUPPORTING MULTIMEDIA COMMUNICATIONS

BACKGROUND

1. Technical Field

This present invention relates generally to communication systems and more particularly to a system and associated method of operation for managing bandwidth available within a wireless communication system to apportion the bandwidth among various multimedia data transmission and voice transmission operations to achieve desired bandwidth performance for the operations.

2. Related Art

Both wired and wireless communication systems are well known. As such communication systems have developed, the systems have proceeded from supporting merely voice communications to supporting other types of information as well. Information commonly communicated in such communication systems now includes, besides voice communications, encoded audio data such as music, encoded video information, facsimile transmissions and formatted file data, among other types of information. Cumulatively, such information in various formats is referred to as multimedia information.

Various standards currently exist for wireless communication systems. The Advanced Mobile Phone System (AMPS) has facilitated wireless cellular communications within the United States for years. As technology has advanced other standards have also been developed and implemented throughout the world to provide wireless communications. The Narrowband Advanced Mobile Phone Service (NAMPS) standard, the Global Standard for Mobility (GSM) standard and the Code Division Multiple Access (CDMA) standard, for example, are currently employed to provide wireless communication.

Over the years, the demands placed upon wireless communication systems have increased as well. Such demands originally increased due to greater user traffic within the wireless communication systems. However, with the advent of multimedia communications, additional bandwidth is now required for the transfer of multimedia information. As compared to the requirements for analog voice transmissions, these requirements are great.

For example, analog wireless voice communication systems may require as little as eight kilohertz of bandwidth for analog voice transmissions, or less. However, multimedia communications typically require much greater bandwidth. The standard bandwidth required for digitized packet data transmission for Internet applications typically is, at a minimum, 14.4 kilobits per second (KBPS). Shortly, 33.3 KBPS of bandwidth will be required for standard Internet applications. Heretofore, such bandwidth was achievable only through the use of a wired connection in a wired communication system. Wired modems, operating between 14.4 to 33.3 KBPS, generally provided sufficient bandwidth for most Internet users. Alternatively, Integrated Services Digital Network (ISDN) lines used in conjunction with ISDN modems provided relatively greater bandwidth for users. However, such bandwidths were only obtainable in a wired communication system.

In existing wireless systems operating according to the AMPS standard, multimedia data transmission may be provided via modems operating on voice channels. Such modems are commonly referred to as Cellular Digital Packet Data (CDPD) modems. Such CDPD modems allow standard voice channels to transmit and receive digitized data. In this fashion, a wireless service subscriber could use a wireless link to transmit and receive multimedia data within the wireless system. However, the bandwidth provided by such CDPD modem typically was less than 9600 bits per second (BPS). Thus, such solution failed to provide enough bandwidth for typical multimedia applications.

Thus there exists a need in the art for a system and associated method of operation that will provide sufficient bandwidth in a wireless communication system for multimedia communications.

SUMMARY OF THE INVENTION

A communication system according to the present invention provides wireless voice and multimedia communications and includes a base station, a plurality of wireless mobile units and a bandwidth allocator. The base station provides wireless coverage throughout a service area and has a bandwidth for providing the wireless coverage. Such bandwidth facilitates both voice communications and multimedia communications. The plurality of wireless mobile units operate within the service area and communicate with the base station to transmit and receive both voice communications and multimedia communications. The bandwidth allocator selectively allocates the bandwidth in response to wireless multimedia communication requirements to achieve a minimum transmission rate for multimedia communications.

The communication system may include a plurality of channels, each having a channel bandwidth with the bandwidth allocator selectively allocating the channels in response to the multimedia communication requirements to achieve the minimum transmission rate. The base station may also include a plurality of data modems, each of the data modems providing a respective portion of the bandwidth, the bandwidth allocator selectively allocating the plurality of data modems of the base station to achieve the minimum transmission rate. Further, at least one of the wireless mobile units may include a plurality of data modems with the bandwidth allocator selectively allocating the data modems of the wireless mobile unit to achieve the minimum transmission rate. In such case, each of the of the plurality of modems may be assigned to a channel.

The system of the present invention may operate according to various communication protocols. In accordance with some communication protocols, the bandwidth allocator may allocate time divisions of the bandwidth to achieve the minimum transmission rate while in other protocols the bandwidth allocator may allocate code divisions of the bandwidth to achieve the minimum transmission rate. Operating in accordance with any of various protocols, the bandwidth allocator may further provide a minimum bandwidth for voice communications.

In one embodiment, the base station may include a base station controller and a plurality of base transceiver stations coupled to the base station controller. In such case, the base station controller includes a wired Internet connection that provides access to the Internet, a public switched telephone system connection and a wireless service interface that facilitates the voice communications and the multimedia communications within the service area. Further, in such case, each base transceiver station provides wireless communications within a respective cell.

The service interface may include a multimedia communication segmentation unit, a multimedia communication assembly unit, a bandwidth negotiation unit and a radio. The multimedia communication segmentation unit segments outgoing multimedia communications for transmission according to allocated bandwidth. The multimedia communication assembly unit reconstructs incoming segmented multimedia communications according to allocated bandwidth. The bandwidth negotiation unit allocates the bandwidth among transmit multimedia communications, receive multimedia communications, transmit voice communications and receive voice communication. Finally, the radio transmits and receives the voice communications and multimedia communications. The service interface may also include a compression unit that compresses transmit voice communications and transmit multimedia communications and a decompression unit that decompresses receive voice communications and receive multimedia communications.

Each of the plurality of wireless mobile units may include a wireless multimedia interface that has a multimedia communication segmentation unit, a multimedia communication assembly unit, a bandwidth negotiation unit and a radio. The multimedia communication segmentation unit segments outgoing multimedia communications for transmission according to allocated bandwidth. The multimedia communication assembly unit reconstructs incoming segmented multimedia communications according to allocated bandwidth. The bandwidth negotiation unit allocates the bandwidth among transmit multimedia communications, receives multimedia communications, transmits voice communications and receives voice communications. Finally, the radio transmits and receives the voice communications and multimedia communications. The multimedia interface may also include a compression unit that compresses transmit voice communications and transmit multimedia communications and a decompression unit that decompresses receive voice communications and receive multimedia communications.

The present invention may include provisions for allocating the bandwidth to establish and maintain a grade of service. Such grade of service may extend to one or more of the mobile units operating in a particular service area. Thus, some of the mobile units, based upon their subscribed levels, receive preference in allocation of bandwidth within the communication system. Further, classes may be established within the communication system to allocate the bandwidth to maintain the grade of service. For example, while a first class may associate with a relatively higher multimedia transmission rate, a second class may associate with a relatively lower multimedia transmission rate. In the example, therefore, those wireless mobile units in the second class would be allocated lesser bandwidth to meet the relatively lower multimedia transmission rate. Further, classes may be established such that the minimum transmission rate is established when bandwidth is available but otherwise the transmission rate is not met.

The communication system may also include management capabilities that indicate the state of the communication system with respect to transmission rate performances. The management capabilities may provide feedback to a system manager, indicating to the manager how well the communication system is performing. Such performance may be measured in a fashion to indicate how the communication system is meeting its grade(s) of service and to indicate how the communication system is providing the classes of service to wireless mobile units operating within the communication system. The system manager may then allocate or deallocate system resources to adjust the available bandwidth in the communication system based upon the information provided.

The present invention also includes a method for accomplishing steps to allocated bandwidth within a communication system to achieve a minimum transmission rate for multimedia communications. The method includes steps for compressing data, segmenting data, allocating bandwidth and such other steps as is required to achieve the minimum transmission rate.

Moreover, other aspects of the present invention will become apparent with further reference to the drawings and specification which follow.

DETAILED DESCRIPTION OF THE DRAWINGS

Figure 1:
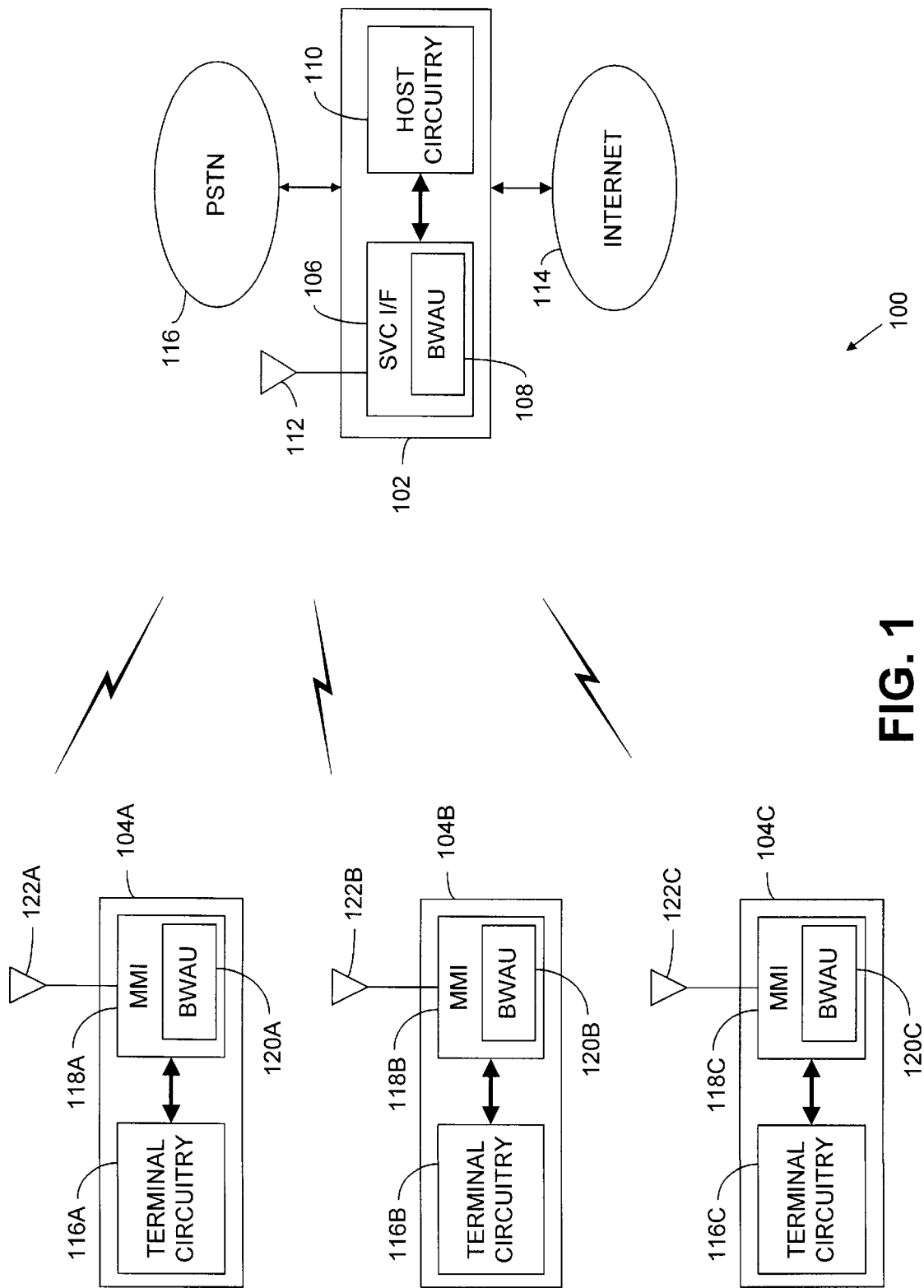
FIG. 1 is a block diagram illustrating a communication system for providing wireless voice and multimedia communications in accordance with the present invention.

FIG. 1 illustrates a communication system 100 constructed according to the present invention. The communication system 100 includes a base station 102 and a plurality of wireless mobile units 104A–104C. The communication system 100 further includes a bandwidth allocator that may reside wholly within the base station 102 or, as is the case with the embodiment of FIG. 1, may be distributed among the base station 102 and the plurality of wireless mobile units 104A–104C.

The base station 102 provides wireless coverage throughout a service area. The base station 102 includes a wireless bandwidth for providing the wireless coverage, the wireless coverage facilitating both voice communications and multimedia communications. Each of the wireless mobile units 104A through 104C operates within the service area and communicates with the base station 102 to transmit and receive both voice communications and multimedia communications. The communication system 100 of the present invention may comprise a cellular system providing coverage to a large number of mobile units over a large area or may provide coverage within a smaller area, serving a relatively smaller number of mobile units. Principles described herein apply equally independent of the relative size of the communication system 100.

In the communication system 100, the bandwidth allocator includes a service interface 106 located in the base station 102 and multimedia interfaces 118A–118C located in the mobile units 104A–104C, respectively. Such service interface 106 and multimedia interfaces 118A–118C operate in cooperation to allocate the available bandwidth within the communication system 100 bandwidth in response to wireless multimedia communication requirements to achieve a minimum transmission rate for the multimedia communications. In this fashion, based upon the transmission requirements between the base station 102 and mobile units 104A–104C, the available wireless bandwidth provided by the base station 102 may be allocated and reallocated as is required to meet the minimum transmission rate for multimedia communications.

The base station 102, in addition to including the service interface 106, also includes host circuitry 110, a wired Internet connection 114, and a public switched telephone network (PSTN) connection 116. The host circuitry 110 couples to the service interface 106 and provides conventional functionality to support operation of the base station 102. Part of the functionality provided by the host circuitry 110 allows communications to be established and maintained between the base station 102 and the Internet via the wired Internet connection 114 and between the base station 102 and the PSTN via the PSTN connection 116. Thus, as compared to base stations otherwise known in the art, the base station 102 according to the present invention includes additional connections for providing the multimedia communications. Connections made for supporting the multimedia communications may be had via the PSTN connection 116 as well as the wired Internet connection 114. Thus, a base station 102 according to the present invention need not necessarily include both the PSTN connection 116 and the wired Internet connection 114.

The service interface 106 includes a bandwidth allocator unit (BWAU) 108 and an antenna connection 112. Such BWAU 108 operates in conjunction with bandwidth allocator units (BWAUs) 120A–120C located within the wireless mobile units 104A–104C to achieve the minimum transmission rate for multimedia communications. As will be further described herein, the BWAU 108 and BWAUs 120A–120C continually allocate, reallocate and deallocate the available wireless bandwidth within the communication system 100 to achieve the minimum multimedia bandwidth requirement. The service interface 106 also includes such known radio circuitry (not shown) as may be required to facilitate wireless communications. The radio circuitry may facilitate various operation in accordance with various wireless protocols within the communication system 100, such protocols including, but not limited to AMPS, NAMPS, GSM, CDMA, TDMA and other protocols.

Each of the wireless mobile units 104A–104C includes additional components. With particular reference to wireless mobile unit 104A, the unit 104A includes terminal circuitry 116A coupled to the multimedia interface 118A to provide standard functionality for the mobile unit 104A. Such standard functionality typically would provide an interface to a user of the mobile unit as well as such other functionality as may be required for the specific application. Antenna 122A connects to at least one radio (not shown) contained within the multimedia interface 118A, the radio facilitating operation consistent with the protocols under which the base station 102 is operating.

The multimedia interface 118A also includes a BWAU 120A that operates in conjunction with the BWAU 108 of the service interface 106 to provide voice and multimedia communication between the wireless mobile unit 104A and the base station 102. Such multimedia interface 118A could comprise a module that plugs into a host unit that contains the terminal circuitry 116A or may be integrally formed with other components of the wireless mobile unit 104A. In this fashion, the multimedia interface 118A could be interchangeable based upon the particular requirements of the system. Wireless mobile units 104B and 104C are constructed similarly to the wireless mobile unit 104A and include additional components such as terminal circuitry 116B–116C, antennas 122B–122C and BWAUs 120B–120C, respectively.

By selectively allocating bandwidth available for multimedia communications among the wireless mobile units 104A–104C, the communication system 100 of the present invention provides and satisfies the particular bandwidth requirements for multimedia communications. Allocation and reallocation of bandwidth according to the present invention considers the varying operational requirements of modern wireless systems and the particular bandwidth limitations placed on such systems. By using available bandwidth, the number of users who may access the base station 102 within the service area is maximized, the relative performance achieved by each mobile unit is maximized and the overall system usage is maximized as well.

The bandwidth allocator may allocate the bandwidth to establish and maintain a grade of service. Such grade of service may extend to one or more of the wireless mobile units 104A–104C operating in the service area. Thus, some of the mobile units, based upon their subscribed grade of service levels, receive preference in the allocation of bandwidth within the communication system. Further, classes may be established within the communication system to allocate the bandwidth to maintain the grade of service at differing minimum transmission rates. For example, a first class may provide a grade of service at a relatively higher multimedia transmission rate while a second class may provide a grade of service with a relatively lower multimedia transmission rate. In the example, therefore, those wireless mobile units in the second class would be allocated lesser bandwidth to meet the relatively lower multimedia transmission rate.

Further, classes of service may be established so that the minimum transmission rate is established when bandwidth is available but otherwise is not met. In such classes, during light loading periods, a wireless mobile unit, 104C for example, may be allocated sufficient bandwidth to meet the minimum transmission rate. However, during heavier loading periods, the wireless mobile unit 104C would receive insufficient bandwidth to meet the minimum transmission rate. Other terminals, 104B for example, may be in a class that has priority in receiving bandwidth during heavy loading periods to meet the minimum transmission rate. As is evident, the bandwidth available within the communication system 100 may be allocated in various ways to provide varying levels of transmission capacity among the mobile units.

The communication system 100 may also include management capabilities that indicate the state of the communication system 100 with respect to transmission rate performances. The management capabilities provide feedback to a system manager, indicating to the manager how well the communication system is performing in meeting the minimum transmission rate. The system manager may then allocate or deallocate system resources to adjust the available bandwidth in the communication system based upon the information provided.

Figure 2:
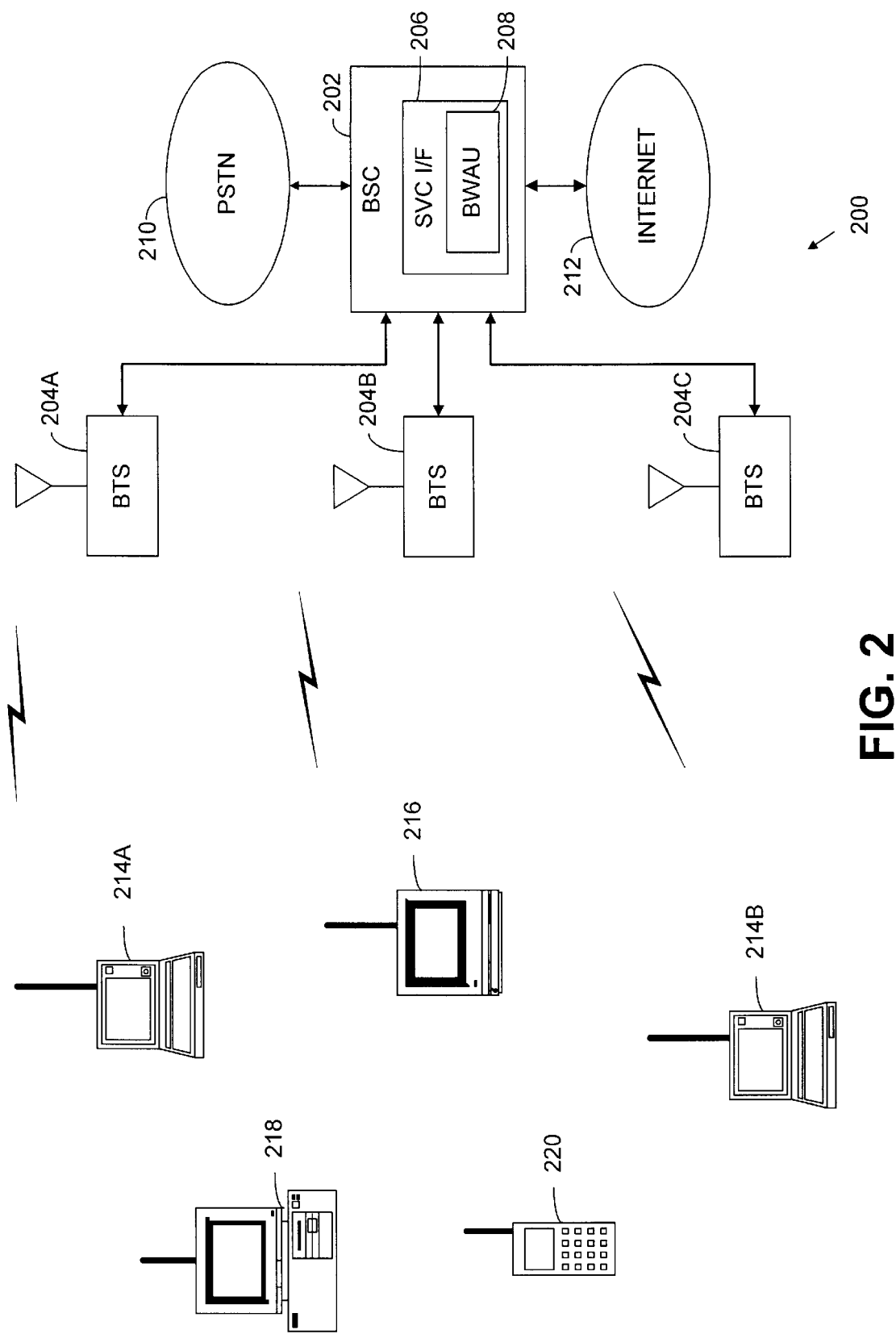
FIG. 2 is a block diagram illustrating an alternative construction of a communication system for providing wireless voice and multimedia communications according to the present invention.

FIG. 2 illustrates another embodiment of a communication system 200 constructed according to the present invention. In contrast to the construction of FIG. 1, the system 200 has a base station that includes a Base Switching Center (BSC) 202 and a plurality of base transceiver stations (BTSs) 204A–204C. Each of the BTSs 204A–204C provides coverage within a respective area while the BTSs 204A–204C cumulatively provide the wireless coverage throughout the service area.

As illustrated, each of the BTSs 204A–204C connects to the BSC 202. The BSC 202 includes a connection to the PSTN 210 and to the Internet 212. Further, the BSC 202 includes a service interface 206 having a bandwidth allocation unit 208. The bandwidth allocation unit 208 operates in cooperation with bandwidth allocation units (not shown) located within multimedia interfaces (not shown) contained within a plurality of wireless mobile units operating within the system 200.

Wireless mobile units operating within the service area of the BSC 202 may include laptop computers 214A and 214B, desktop computers 216 and 218 and hand held terminals 220 performing various functions including scanning, measuring and performing transactions among other functions. Each of the wireless mobile units may include a multimedia interface. Such multimedia interface may connect to a respective one of these mobile units via a slot or port. For example, laptop computers 214A and 214B commonly include Personal Computer Memory Card International Association (PCMCIA) slots. The wireless multimedia interface for the particular laptop computer 214A or 214B could be constructed as a PCMCIA compatible card. Further, with respect to desktop computer 216, the multimedia interface could be included in a card or a device compatible with SCSI bus. Moreover, with respect to desktop computer 218, the multimedia interface could comprise a card compatible with a PCI or ISA bus. However, the multimedia interface could simply be integrally constructed other circuitry contained within the particular wireless mobile unit.

Figure 3:
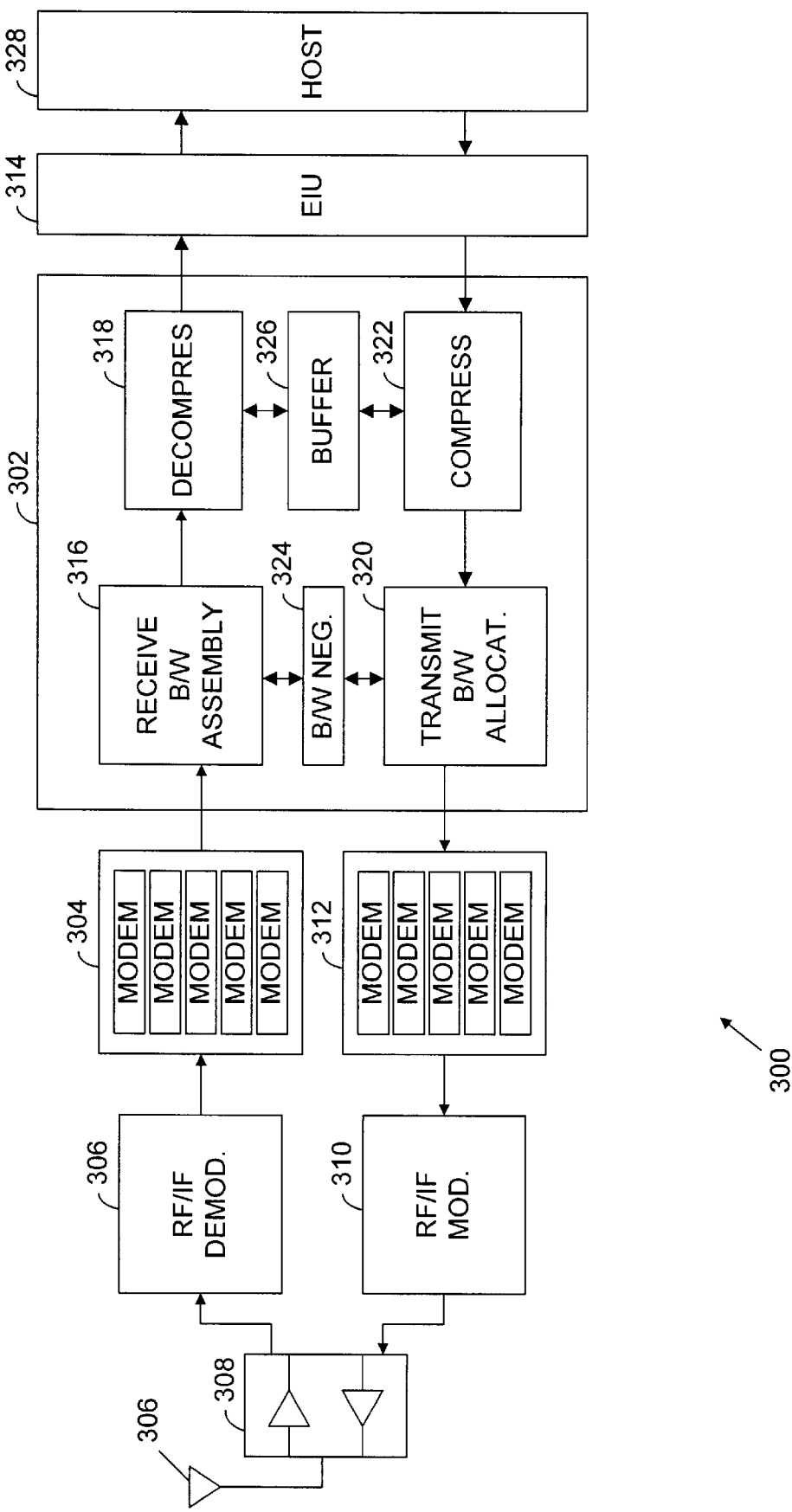
FIG. 3 is a block diagram illustrating a service interface constructed according to the present invention.

FIG. 3 illustrates the particular construction of a service interface 300 that may be included in the base station 102 of FIG. 1 or the BSC 202 of FIG. 2. The service interface 300 includes compression/decompression and assembly/ allocation block 302, an electronic interface unit (EIU) 314, modem blocks 304 and 312, radio blocks 306 and 310, a coupling block 308 and antenna 306. The EIU 314 couples the service interface 300 to a host unit 328. The compression/decompression and assembly/allocation block 302 includes a receive bandwidth assembly unit 316, a decompression unit 318, a transmit bandwidth allocation unit 320, a compression unit 322, a bandwidth negotiation unit and a buffer 326.

In the transmission path, the service interface 300 receives multimedia data from the host unit 328 via the EIU 314. Such data may comprise TCP/IP packets received via an Internet connection 114, for example, to be transmitted to a wireless mobile unit operating within a service area serviced by a base station within which the service interface 300 resides. During such operation, compression block 322 receives the digitized packet data, buffers such data as required in buffer 326, compresses the data and then passes the data to the transmit bandwidth allocation block 320.

The transmit bandwidth allocation block 320 receives such compressed data and negotiates for transmission bandwidth with a receive bandwidth assembly block 316 via bandwidth negotiation unit 324. Based upon such negotiation via the bandwidth negotiation unit 324, modems within transmit modem block 312 are allocated for the transmission of the digitized packet data. If more than one transmit modem is allocated for a particular transmit data structure, the transmit bandwidth allocation unit 320 segments data and provides the data to the allocated transmit modem.

Each of the modems within the transmit modem block 312 may include a modem operating according to the cellular digital packet data (CDPD) standards. In such case, the modems of the transmit modem block 312 would comprise CDPD modems, each of which operated upon a particular channel serviced by the base station. Over time, the number of modems in the transmit modem data block 312 allocated for transmissions to a particular mobile unit would vary based upon transmission requirements existing at the particular time.

The transmit radio block 310 receives the output from the transmit modem block 312, modulates the output from the transmit modem block at one or more appropriate radio frequencies, and passes it through the coupling unit 308 to the antenna 306 for wireless transmission. The transmissions are then received by intended wireless mobile units operating within the service area.

In a receive path, the service interface 300 receives wireless data from the wireless mobile units operating within the service area via antenna 306. Such wireless data is then passed through the coupling unit 308 to the receive radio unit 306 where it is demodulated and then passed to the receive modem block 304. Receive modems contained within the receive modem block 304 were previously allocated to channels serviced by a base station within which the service interface 300 resides. Such receive modems contained within the modem block 304 may include CDPD modems, each of which provides a certain bandwidth of the available bandwidth within the service area of the base station.

A receive bandwidth assembly block 316 receives the data from the receive modem block 304 and assembles the data as required. When packets of data, for example TCP/IP packets, are received according to the system of the present invention, such packets may have been segmented prior to their transmission. Upon receipt, the segmented packets pass through a plurality of the receive modems where the segmented packets are demodulated and then passed to the receive bandwidth assembly block 316. The receive bandwidth assembly block 316 then assembles the segmented packets into correctly assembled data block(s). After the data is correctly assembled, the data is passed to decompression block 318 where it is decompressed and then to the electronics interface unit 314. From the electronics interface unit 314, the data is passed to other circuitry contained in the base station.

Thus, the service interface 300 constructed according to the present invention achieves increased performance by allocating multiple communication bandwidth segments for a single logical communication path. In prior art systems, single segments of bandwidth were allocated to particular wireless units. When the single segments of bandwidth were insufficient, data was buffered as either end of the wireless link until the communication could be obtained. Such buffering of data and waiting for transmission reduced the performance of the link between the two points. Thus, the present invention overcomes such limitation by allocating multiple segments of bandwidth for a single communication path when the requirements of the communication path justify such multiple bandwidth segment allocations.

Figure 4A:
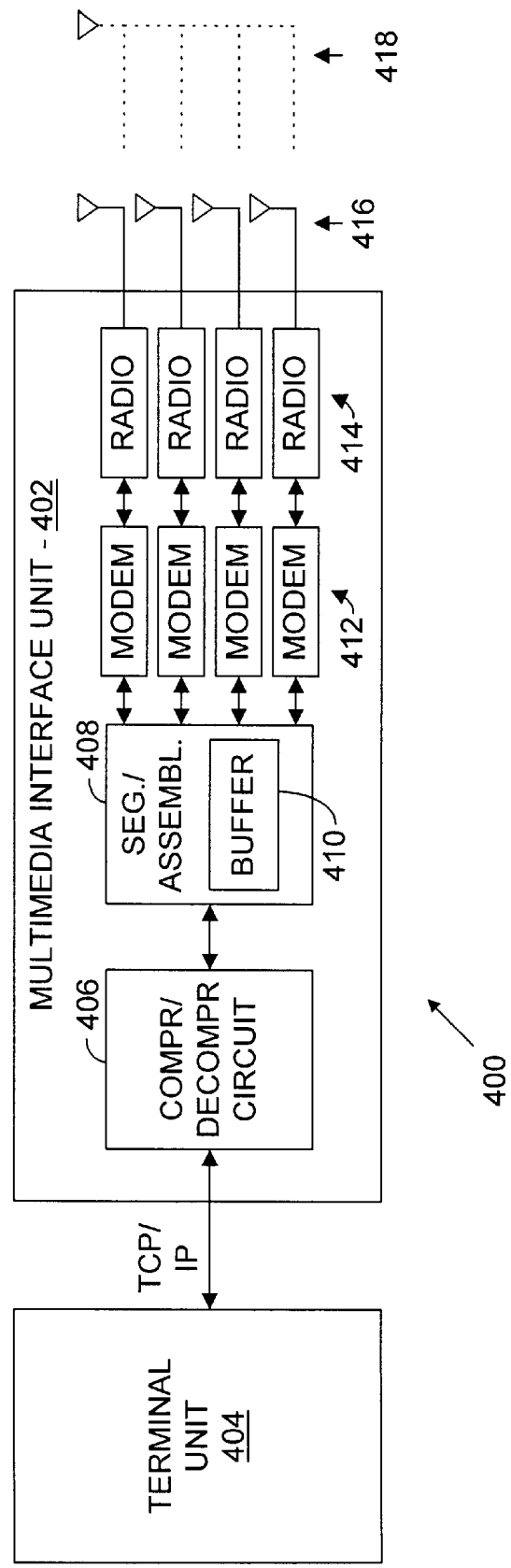
FIGS. 4A and 4B are block diagrams illustrating multimedia interface units constructed according to the present invention.
Figure 4B:
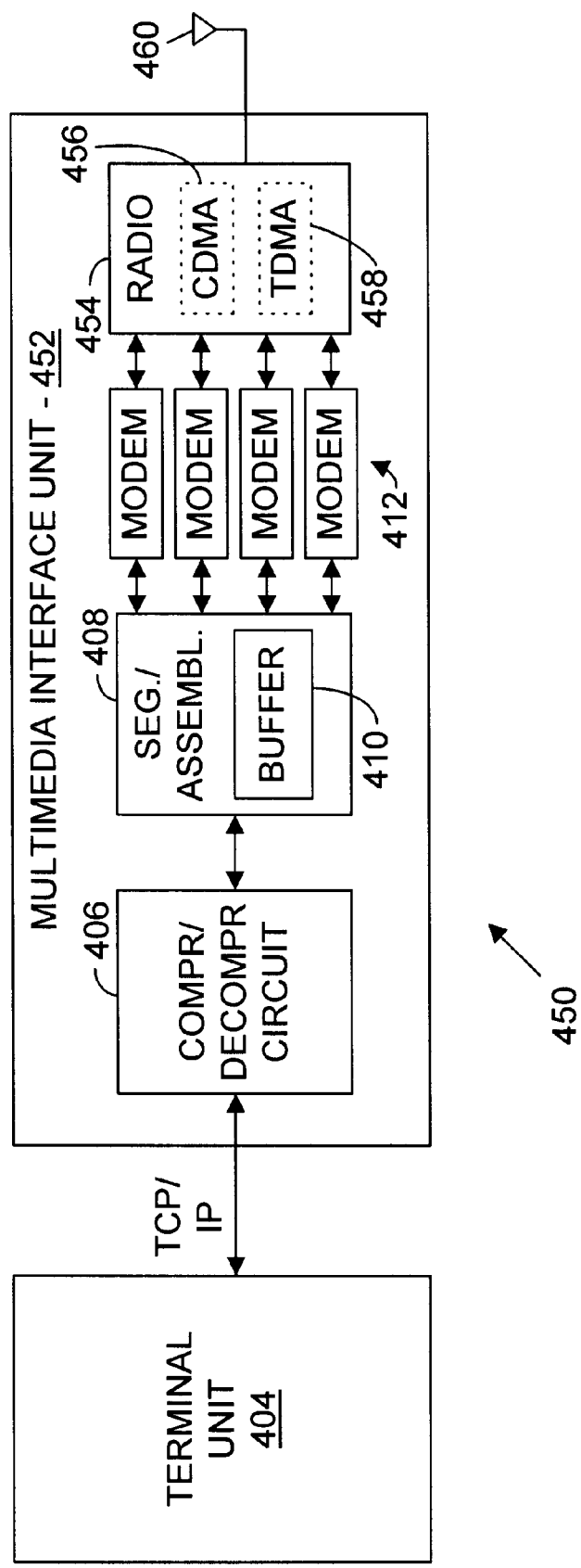

FIGS. 4A and 4B illustrate constructions of wireless mobile units having multimedia interface units according to the present invention. In particular, FIG. 4A illustrates a particular wireless mobile unit 400 having a multimedia interface unit 402 coupled to a terminal unit 404. The multimedia interface unit 402 includes compression/decompression circuitry 406, segmentation/assembly circuitry 408, a plurality of modems 412, and a plurality of radios 414, each of which is connected to one of a plurality of antennas 416. The components described for the multimedia interface unit 402 work bi-directionally to provide both transmit and receive capability. When a plurality of terminal units 404 are interconnected, such as in a local area network, for example, a single multimedia interface unit 402 may service the plurality of terminal units 404.

The compression/decompression circuitry 406 provides compression/decompression functions for data passing through the multimedia interface unit 402. The segmentation/assembly unit 408 includes a buffer 410 and segments and assembles data as is required based upon which of the plurality of modems 412 are dedicated to each transmission or receive operation. For example, significant data transmission is often required by Internet browsers when receiving HTML web pages. HTML web pages may include many kilobytes or megabytes of information. Typically, a request is sent from a user of a terminal unit 404 to receive such HTML files. The transmit request comprises small segments of data while the web pages include large segments of data.

According to the present invention, a single modem of the plurality of modems 412 may submit a request to receive a web page. However, on the receive path, such single modem of the plurality of modems 412 would provide insufficient bandwidth for satisfactory operation. Thus, two or more of the modems of the plurality of modems 412 are allocated for the receipt of the web pages. Once the web pages or other data is received, the modems may be deallocated so that the corresponding bandwidth is available for use by other terminal units. The system of the present invention allows for modification of bandwidths depending upon the particular transmission requirements for each of the wireless mobile units. In this fashion, the systems achieve a minimum transmission rate for multimedia communications within the system.

Each of the modems may be coupled to its own radio of the plurality of radios 412. In such case, each of the plurality of radios 412 provides access to a channel of a plurality of channels supported by the wireless mobile unit 400. Each of the radios of the plurality of radios 414 may couple to a respective antenna of the plurality of antennas 416. However, in another embodiment, each of the plurality of radios 414 may couple to a common antenna 418. Such coupling and functions are dependent upon the particular protocol(s) supported by the mobile unit within which the multimedia interface unit 402 supports.

FIG. 4B illustrates a wireless mobile unit 450 having multimedia interface unit 452 and a terminal unit 404 coupled to provide multimedia communication support. Components described with reference to FIG. 4B having reference numbers identical to those of the elements described with reference to FIG. 4A have same or similar functionality and will not be further described herein with reference to FIG. 4B.

In contrast to the wireless mobile unit 400 of FIG. 4A, the multimedia interface unit 452 of the wireless mobile unit 450 of FIG. 4B includes a radio 454 that operates according to a CDMA standard or a TDMA standard. Thus, the radio 454 may operate at varying frequencies and with varying chipping sequences depending upon its particular mode of operation. The radio 454 thus includes a code division multiple access block 456 and/or a time division multiple access block 458 to provide such functions. In this construction, antenna 450 connects to radio 454.

In a CDMA mode, each of the modems 412 may be assigned a particular chipping sequence for operation within the CDMA protocol. Furthermore, in a TDMA mode, each of the modems 412 may be assigned a particular time division within which they can transmit and/or receive data. Thus, while the wireless mobile unit 400 of FIG. 4A included a different radio for each modem, the wireless mobile unit 450 of FIG. 4B uses a common radio for the plurality of modems 412, with each of the modems assigned a particular code division or time division, whichever the case may be.

Figure 5:
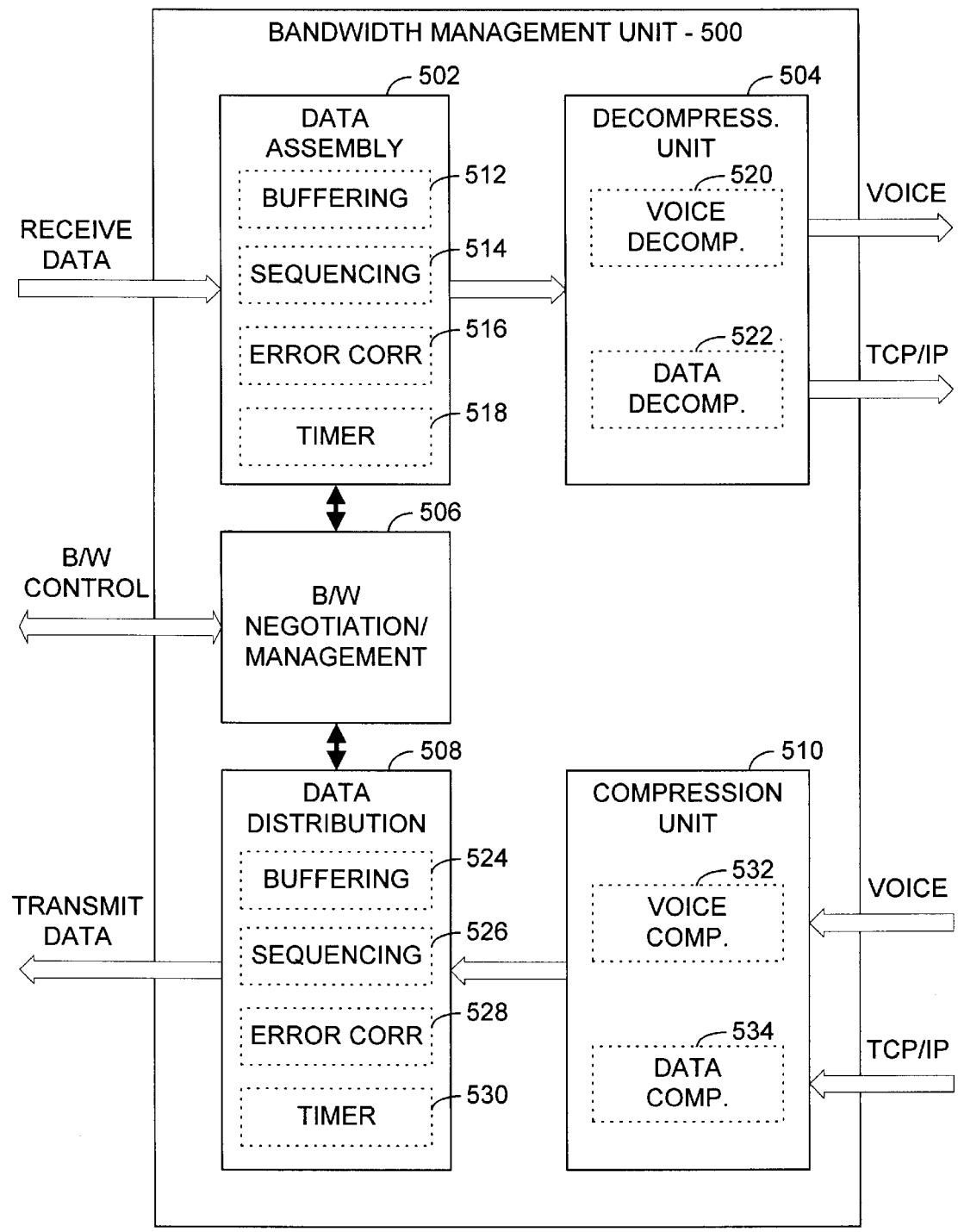
FIG. 5 is a block diagram illustrating a bandwidth management unit that may be incorporated within a service interface or a multimedia interface unit.

FIG. 5 illustrates a particular construction of a bandwidth management unit 500 operable with the system 100 of the present invention. Such bandwidth management unit 500 may be contained within or form a part of a service interface or a multimedia interface, whichever the case may be depending upon the implementation. The bandwidth management unit includes a data assembly unit 502, decompression unit 504, bandwidth negotiation/management unit 506, data distribution unit 508, and a compression unit 510.

The compression unit 510 and data distribution unit 508 operate in the transmission of data. In such case, compression unit 510 receives TCP/IP data, for example, and also voice data. The voice compression unit 532 compresses the voice data received by the compression unit 510 while the data compression unit 534 compresses multimedia data received. Typically, voice data received by the compression unit 510 may be compressed at a higher compression factor than the multimedia data received by the compression unit.

The data distribution unit 508 receives the compressed data from the compression unit 510. The data distribution unit 508 includes a buffering unit 524, a sequencing unit 526, an error correction unit 528, and a timer 530. The buffering unit 524 buffers data received from the compression unit 510 prior to its transmission as transmit data. The sequencing unit 526 segments the compressed data received from the compression unit 510 as required to distribute transmissions across a plurality of bandwidth segments. For example, as was described with reference to FIGS. 3 and 4A through 4B, compressed data received from the compression unit 510 may be segmented such that it passes over a plurality of transmission bandwidth segments. In such case, the sequencing unit 526 establishes a sequence for such segments so that they may be correctly assembled upon receipt. The error correction unit 528 establishes error correction criteria so that errors in transmission are determined. The timer 530 may be used to time out particular operations as required.

The bandwidth negotiation and management unit 506 operates in conjunction with the data distribution unit 508 and data assembly unit 504. The bandwidth negotiation and management unit 506 controls the bandwidth within the particular service area. Such bandwidth negotiation management may be performed on a control channel within the service area. In one embodiment of the present invention, the bandwidth negotiation and management unit 506 is contained within a base station controls all bandwidth allocated within the service area. However, in other situations, each of the wireless mobile units could provide partial control relating to the bandwidth within the service area, such control accomplished with an arbitration scheme.

The data assembly unit 502 and decompression unit 504 operate conversely to the data distribution unit 508 and compression unit 510, respectively. The data assembly unit 502 includes a buffering unit 512, a sequencing unit 514, an error correction unit 516, and timer 518. The data assembly unit 502 assembles received data. The buffering unit 512 buffers the received data as is required while the sequencing unit 514 correctly assembles the received as required. The error correction unit 516 detect errors and perform error correction as required. The timer 518 provides a time out indication when such is required. Once the data has been assembled at the data assembly unit 502, the data is passed to the decompression unit 504. Such data is decompressed by the voice decompression unit 520 and the data decompression unit 522 as the case may be. The data decompression unit 504 produces the multimedia data, for example in the TCP/IP format and the voice data format.

Figure 6:
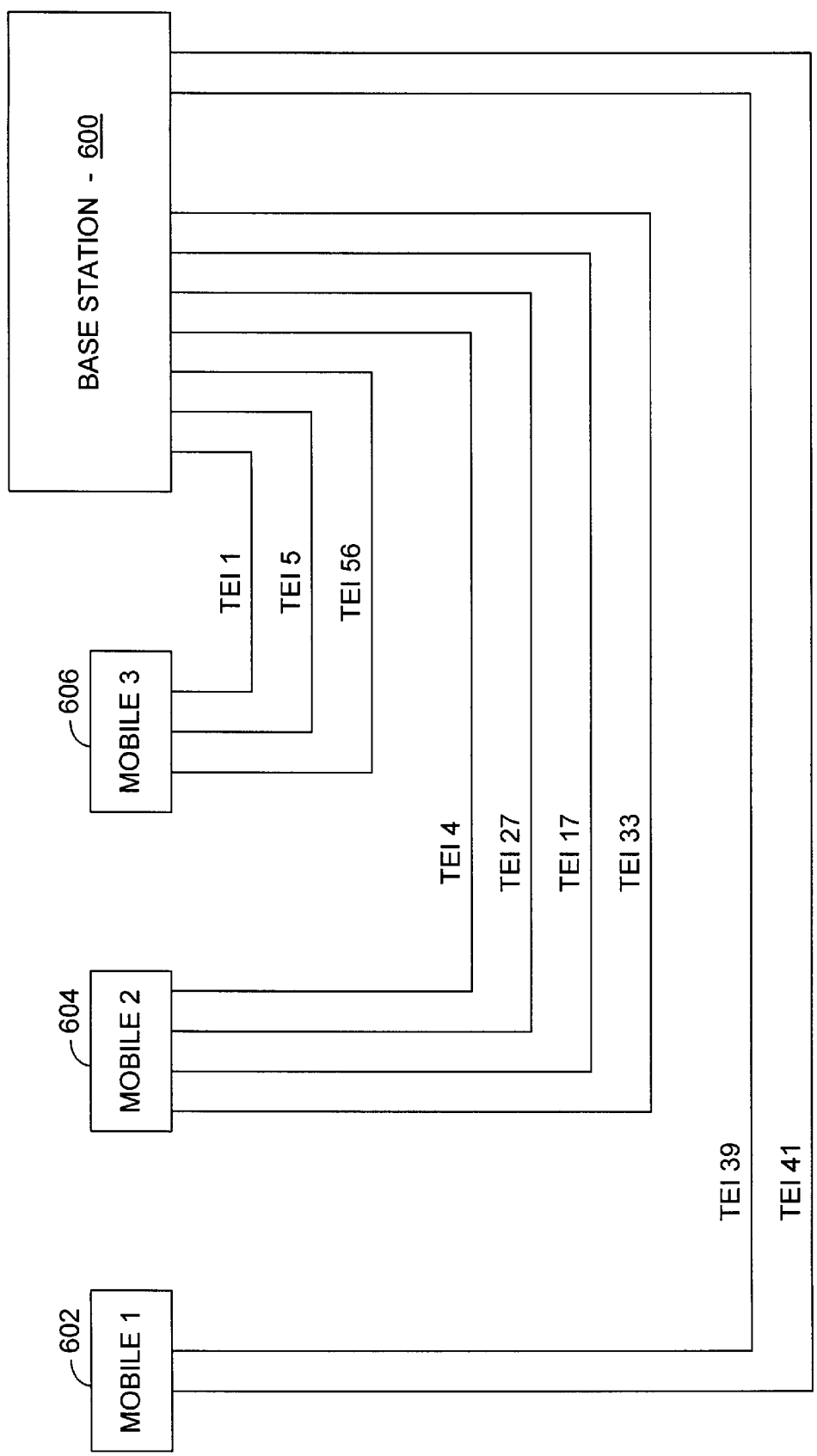
FIG. 6 is a diagram illustrating logical connections between a base station and a plurality of mobile units in wireless communication within the communication system according to the present invention, the logical connections representing bandwidth segments assigned according to required transmission rates.

FIG. 6 is a diagram illustrating logically the relationship between the base station and mobile units 602, 604, and 606. As is shown, base station 602 includes two logical connections to wireless mobile unit 602. These logical connections are referenced as terminal endpoint identifiers (TEIs) 39 and 41. In such case, unit 39 may serve as a voice connection between base station 600 and wireless mobile unit 602. Further, terminal endpoint 41 serves as a logical connection for multimedia data transmitted between base station 600 and wireless mobile unit 602. However, multiple logical connections may be established between the base station 600 and one of the wireless mobile units for each type of data.

While each of these TEIs provides a logical connection, the TEIs providing the multimedia communication link between the base station 600 and one of the mobile units may have a common TCP/IP Internet address. In such cases, the segmentation and desegmentation units contained within the service interfaces and the multimedia interfaces segment the data so that the segmented data is distributed over the multiple TEIs. For example, the connection between base station 600 and the wireless mobile unit 604 includes four logical links, TEI 4 provides a voice link between the wireless mobile unit 604 and the base station while TEIs 27, 17, and 33 provide multimedia links between the base station 600 and the wireless mobile unit 604. Thus, three distinct logical paths provide three segments of bandwidth for multimedia communications between the base station 600 and the wireless mobile unit 604.

Further, as illustrated with respect to wireless mobile unit 606, TEI 1, TEI 5 and TEI 56 are established between the base station 600 and wireless mobile unit 606. In this case, two segments of bandwidth are allocated for multimedia communications, a first segment to TEI 5 and a second segment to TEI 56. The principles underlying the logical allocation of bandwidth between the base station 600 and the mobile unit 602 through 606 may be carried forth for more than three segments of bandwidth. For example, depending upon the particular mechanisms used, and the segments of bandwidth available, the principles of the present invention may be applied to such level as may be desirable in any system.

Figure 7:
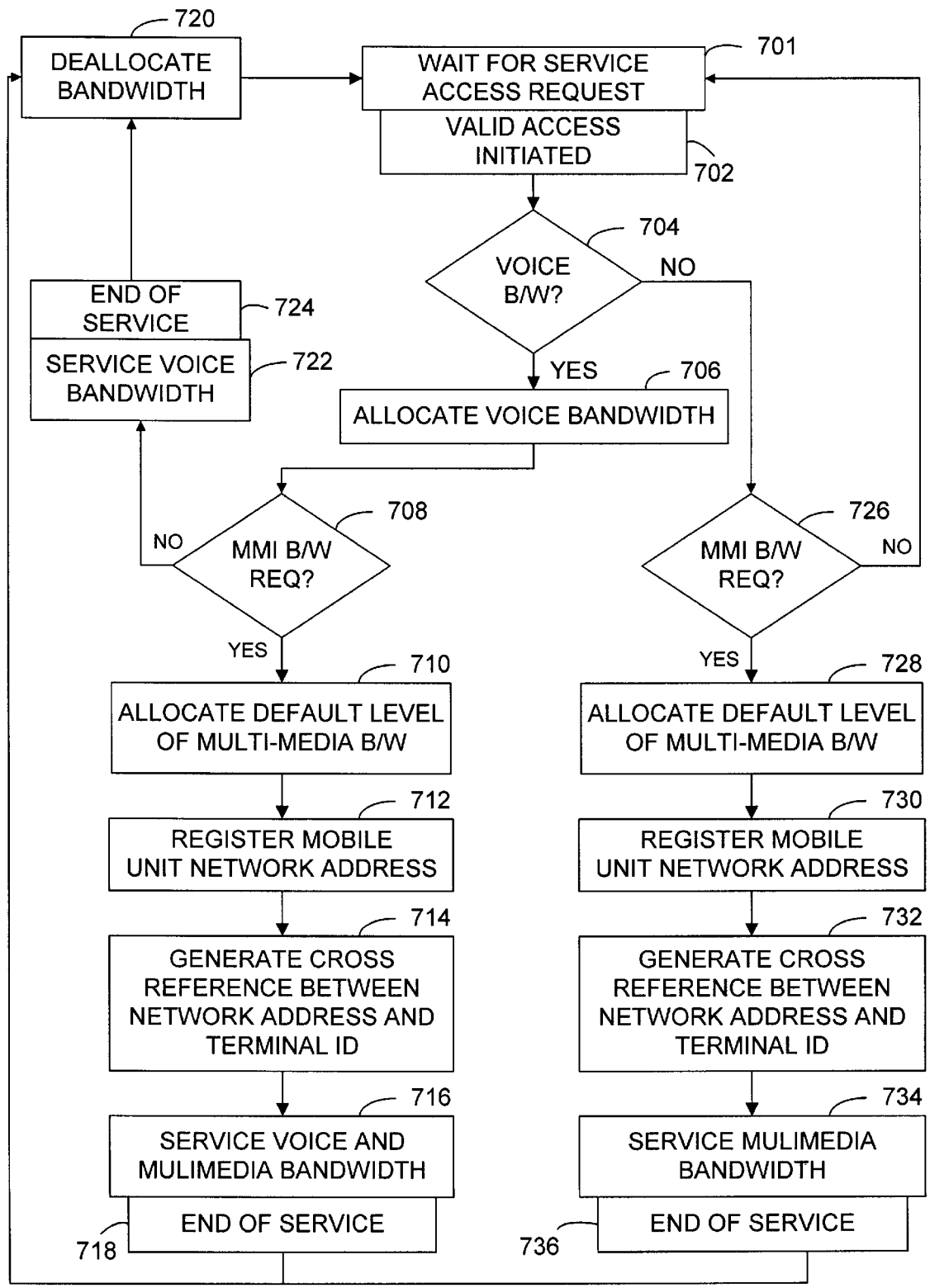
FIG. 7 is a logic diagram illustrating operation of the communication system according to the present invention in initially allocating bandwidth upon registration and in operation corresponding thereto.

FIG. 7 illustrates operation of the system of the present invention in establishing and initially allocating bandwidth to the wireless mobile units operating within the service area. Operation 700 commences at step 701 wherein the base station waits for an access request. Upon such access request at step 701 the base station determines whether the access request from a wireless mobile unit operating within the service area is a valid access at step 702. If such access is not valid at step 702, operation returns to step 701. However, if such access attempt is valid at step 702, operation proceeds to step 704 wherein the base station determines the nature of the access request. If the access request is identified as a valid voice service request at step 706, voice bandwidth to the requesting wireless mobile unit is allocated at step 706.

From step 706, operation proceeds to step 708 wherein the base station determines whether multimedia interface bandwidth is required for the particular mobile unit. If multimedia interface bandwidth is not required for the particular mobile unit, operation proceeds again to step 722 to provide only voice bandwidth service. Upon completion in providing the voice bandwidth service at step 724, the system deallocates the bandwidth at step 720 and then returns to step 701.

If, at step 708, multimedia interface bandwidth is required for the particular wireless mobile unit, operation proceeds to step 710 wherein the bandwidth allocation unit in the service interface of the base station allocates a default level of multimedia bandwidth. In a typical implementation, the bandwidth available for such multimedia transmissions is split into segments. At step 710 then, one of the segments is allocated to the particular mobile unit. However, in other implementations, no bandwidth is allocated for multimedia communications until such bandwidth is required for operation. In such installations, as much bandwidth as possible would therefore be reserved until use is required.

Next, at step 712 the service interface registers the mobile unit's network address for subsequent communications via network addressing protocols. For example, in one implementation, at step 712, the service interface would assign an IP address for the particular mobile unit. Thus, when the particular mobile unit attempts to contact other Internet locations, the Internet address for the particular mobile unit will correspond to the base station with the base station forwarding communications to the mobile unit. Then, at step 714, the service interface generates a cross reference between the network address and the terminal ID or unit for the particular wireless mobile unit. From step 714, operation proceeds to step 716 wherein the system provides the voice and multimedia bandwidths. Upon completion of service at step 718, the system deallocates the voice and multimedia bandwidth at step 720 and then proceeds to step 701.

If at step 704 the system determines that the mobile unit has requested no voice bandwidth, the system then determines whether the mobile unit requires multimedia bandwidth at step 726. If multimedia bandwidth is not required at step 726, operation proceeds again to step 701. However, if multimedia bandwidth is required, operation proceeds to step 728 wherein a default level of multimedia bandwidth is allocated by the system to the mobile unit. Then, at steps 730, the mobile unit's network address is registered. Subsequently, at step 732, the system establishes cross references between the network address of the mobile unit and terminal IDs assigned to the mobile unit. As indicated in the FIG. 7, functions accomplished at steps 728, 730 and 732 are similar to those functions accomplished at steps 710, 712 and 714, respectively. Next, at step 734, only multimedia bandwidth is provided to the requesting mobile unit with such bandwidth continued until an end of service at step 736. Once an end of service occurs at step 736, the multimedia bandwidth is deallocated at step 720.

Figure 8A:
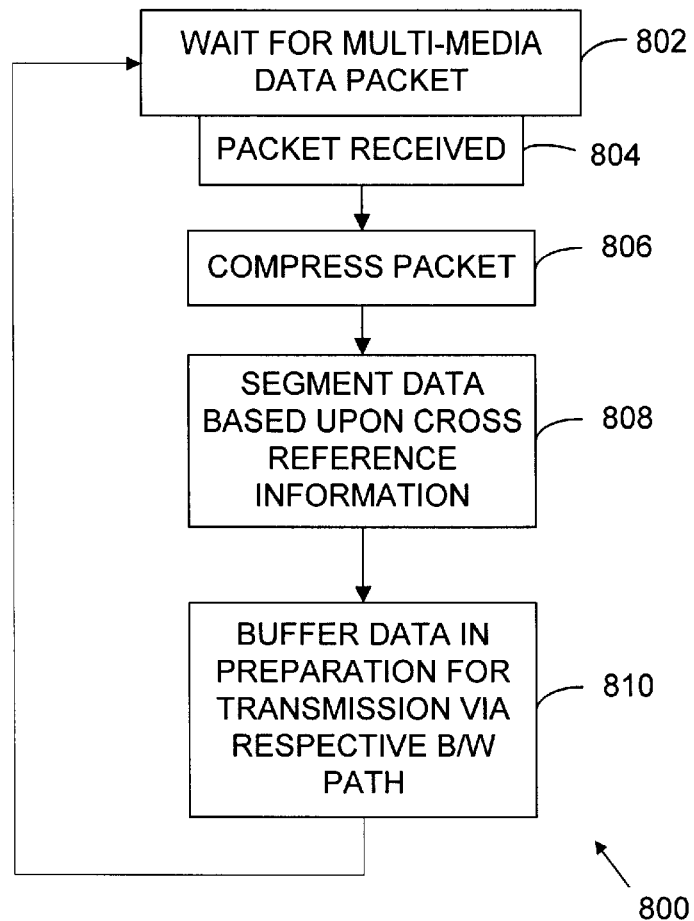
FIGS. 8A and 8B are logic diagrams illustrating operation of the communication system according to the present invention in the receipt, buffering, and transmission of digital packet data via a wireless link established within the system.

FIG. 8A illustrates operation 800 of either the service interface in the base station or a multimedia interface in one of the wireless mobile units in receiving, compressing, segmenting and buffering multimedia data in preparing to transmit the data across a wireless link. At step 802, the system waits for multimedia data packet. When such packet is received at step 804, operation proceeds to step 806 wherein the packet is compressed. From step 806 operation proceeds to step 808 wherein the packet data is segmented based upon cross reference information that was established at step 714 of FIG. 7.

For example, as will be recalled with reference to FIG. 6, multiple TEIs may be established for multiple paths between wireless mobile units and the base station. Such TEI information is contained within the cross-reference information and the compressed packet data is be segmented based upon the cross reference information so that the transmission of such compressed packet data is distributed across the TEI connections. Finally, at step 810, the compressed and segmented packet data is buffered in preparation for transmission via respective bandwidth path. From such step, operation returns to step 802 wherein additional multimedia data packets are awaited. Thus, after the completion of the steps in FIG. 8A packet data received, for example in a TCP/IP format is compressed and segmented so that it may be transmitted over wireless links established.

Figure 8B:
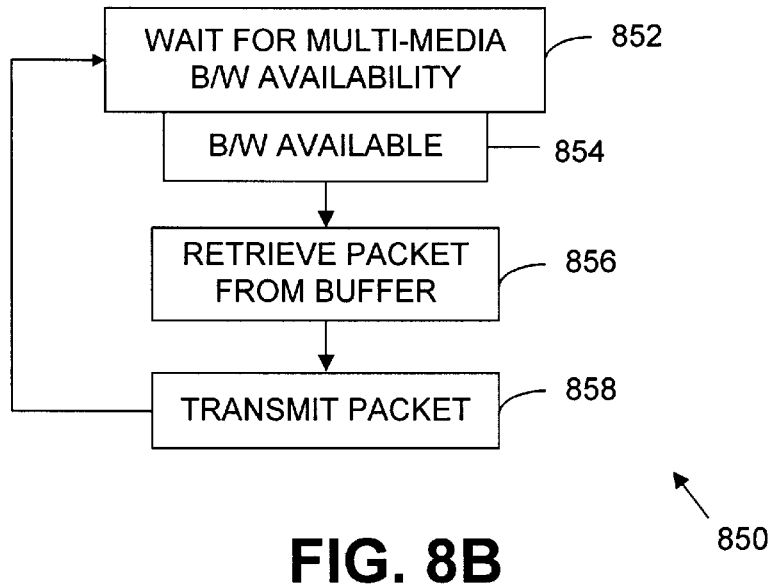

FIG. 8B illustrates operation 850 of a service interface or multimedia interface according to the present invention during the transmission of data. At step 852, operation commences wherein the system waits for multimedia bandwidth availability. Such bandwidths availability may be continuously had in some systems while in other systems, the unit must wait for a particular code sequence or time division wherein the transmission may be accomplished. At such point when bandwidth becomes available at step 854, the system retrieves the compressed and segmented packet data from the respective buffer at step 856. As is recalled, at step 808 of FIG. 8A, the compressed packet data had been segmented according to the particular bandwidth segments available for the transmission. Thus, at step 856, operation proceeds to retrieve compressed packets that have been segmented and are available for the particular bandwidth segment. Once retrieved at step 856, the packets are transmitted at step 858 for their intended destination. At their intended destination, the packets are retrieved and when all packets required are available, the packets are reconstructed in the same manner that they had been segmented. After such reconstruction, the packets are decompressed as has been previously described. Thus, after completion of the steps in FIG. 8B, the receiving location can reconstruct the transmissions and pass them to the terminal unit.

Figure 9:
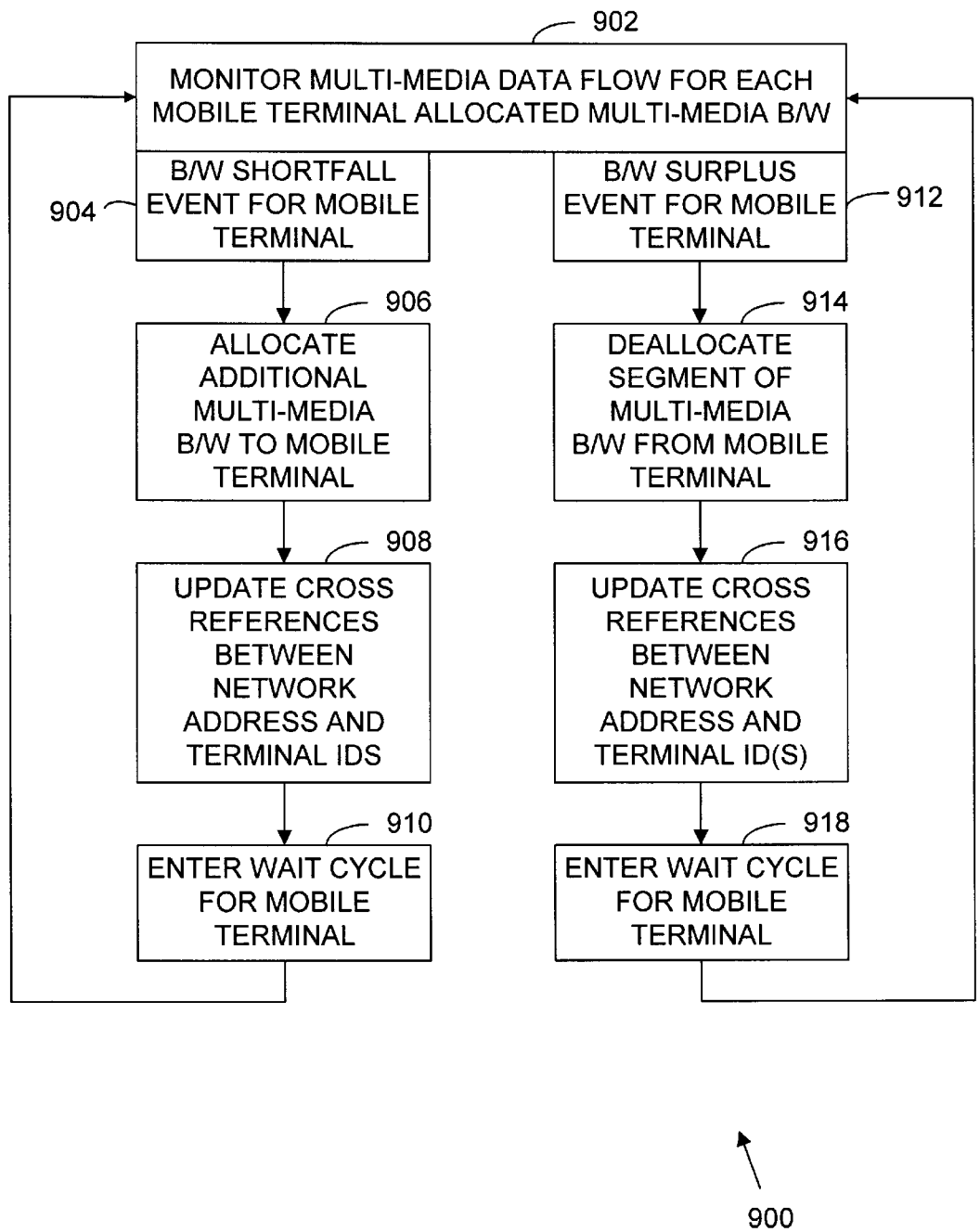
FIG. 9 is a logic diagram illustrating operation of the communication system in allocating additional bandwidth and deallocating bandwidth to one or more of the mobile terminals during operation of the system.

FIG. 9 illustrates operation 900 of the system of the present invention in allocating additional bandwidth and deallocating bandwidth as such allocations and deallocations are required during normal operations. Operation commences at step 902 wherein the bandwidth allocator of the system of the present invention monitors multimedia data flow for each mobile terminal that has been allocated multimedia bandwidth. Such allocations were made at step 710 of FIG. 7. Steps 904 through 910 illustrate operation of the system when insufficient bandwidth has been established for the mobile terminal. Thus, at step 904, the system determines that there has been a bandwidth shortfall event for the particular mobile terminal.

Bandwidth shortfall events may be determined when buffer content for the particular mobile terminal exceed a threshold or when buffer content for each particular bandwidth segment exceed a threshold. Alternatively, the system could determine that a bandwidth shortfall occurs when the buffer contents remain at a particular threshold level or above for a duration of time. In such case, the bandwidth segments that have been established are insufficient to reduce the content of the buffer for the particular wireless mobile unit.

From step 904 operation proceeds to step 906 wherein an additional multimedia bandwidth is allocated to the wireless mobile unit whose bandwidth shortfall event has occurred. Such additional allocation could comprise simply an additional segment of bandwidth or additional segments based upon the particular needs determined by the shortfall. For example, if buffers for one wireless mobile unit consistently exceed a threshold by a large margin, at step 906, more than one bandwidth segment may be allocated in addition to those already existing. However, in another implementation, only an additional bandwidth segment may be allocated.

Then at step 908, the cross references between the network address and the terminal ID's are updated so that segmented packets are distributed amongst the allocated bandwidth segments. Finally, at step 910, the system enters a wait cycle for the particular mobile terminal to allow the system to reduce the buffer loading for the particular mobile terminal. Such waiting at step 910 allows the system to settle down to perhaps a steady state operating condition where no more allocations are required.

Steps 912 through 918 are performed by the system in determining when to deallocate segments of multimedia bandwidth for mobile terminals. Such deallocation occurs during operation of a wireless mobile unit that has previously used more bandwidth than is currently needed. At step 912, the system determines that a bandwidth surplus event for the mobile terminal has occurred. Bandwidth surplus events may occur at such times as buffer contents have been below a threshold for a period of time or when no multimedia communications have occurred between a base station and a particular mobile unit for a period of time. When such bandwidth surplus event for the mobile terminal has been determined at step 912, operation proceeds to step 914 wherein a segment of multimedia bandwidth is deallocated from the particular mobile terminal. Such deallocation of segments may include a smallest sized segment of a larger sized segment depending upon what had been previously allocated and what triggered the bandwidth surplus event for the mobile terminal 912. Operation then proceeds to step 916 wherein the cross references between the network address and terminal ID's are established 916. Then, at step 916, the system enters a wait cycle for the mobile terminal.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

We claim:

1. A communication system for providing wireless voice and multimedia communications to a plurality of wireless mobile units, the communication system comprising:

a base station controller including:

a wired Internet connection that provides access to the Internet;

a public switched telephone system connection;

a base station coupled to the base station controller, the base station providing wireless coverage within a cell, the base station having a bandwidth for providing the wireless coverage, the wireless coverage facilitating both voice communications and multimedia communications; and a wireless service interface coupled to the base station controller and to the base station, the wireless service interface comprising:

a bandwidth allocator that allocates the bandwidth among transmit multimedia communications, receive multimedia communications, transmit voice communications and receive voice communications in response to requirements of the plurality of wireless units;

a multimedia communication segmentation unit that segments outgoing multimedia communications for transmission according to allocated bandwidth; and a multimedia communication assembly unit that reconstructs incoming segmented multimedia communications according to allocated bandwidth.

2. The communication system of claim 1, the bandwidth including a plurality of channels, each channel having a channel bandwidth, the bandwidth allocator selectively allocating the channels in response to the multimedia communication requirements to achieve a minimum transmission rate.

3. The communication system of claim 1, the base station including a plurality of data modems, each of the data modems providing a respective portion of the bandwidth, the bandwidth allocator selectively allocating the plurality of data modems of the base station to achieve the minimum transmission rate.

4. The communication system of claim 3, at least one of the wireless mobile units including a plurality of data modems, the bandwidth allocator selectively allocating the data modems of the wireless mobile unit to achieve a minimum transmission rate.

5. The communication system of claim 3, the bandwidth comprising a plurality of channels, each of the plurality of modems assigned to a respective channel.

6. The communication system of claim 1, the bandwidth allocator allocating time divisions of the bandwidth to achieve the minimum transmission rate.

7. The communication system of claim 1, the bandwidth allocator allocating code divisions of the bandwidth to achieve the minimum transmission rate.

8. The communication system of claim 1, the bandwidth allocator further providing a minimum bandwidth for voice communications.

9. The communication system of claim 1, wherein at least one of the plurality of wireless mobile units interacts with the bandwidth allocator to receive a minimum transmission rate for multimedia communications.

10. The communication system of claim 9, wherein the bandwidth allocator provides the minimum bandwidth for multimedia communications to maintain a grade of service.

11. The communication system of claim 1, the wireless service interface further comprising:

a compression unit that compresses transmit voice communications and transmit multimedia communications; and a decompression unit that decompresses receive voice communications and receive multimedia communications.

12. The communication system of claim 1, each of the plurality of wireless mobile units including a wireless multimedia interface comprising:

a multimedia communication segmentation unit that segments outgoing multimedia communications for transmission according to allocated bandwidth;

a multimedia communication assembly unit that reconstructs incoming segmented multimedia communications according to allocated bandwidth;

a bandwidth negotiation unit that allocates the bandwidth among transmit multimedia communications, receive multimedia communications, transmit voice communications and receive voice communications; and a radio that transmits and receives the voice communications and multimedia communications.

13. The communication system of claim 12, the wireless multimedia interface further comprising:

a compression unit that compresses transmit voice communications and transmit multimedia communications; and a decompression unit that decompresses receive voice communications and receive multimedia communications.

14. The communication system of claim 1, wherein the bandwidth allocator provides at least one grade of service for multimedia communications.

15. The communication system of claim 14, wherein the bandwidth allocator provides multiple classes of service, each class of service associated with a respective grade of service.

16. The communication system of claim 1, wherein the bandwidth allocator provides performance indications to a user, the performance indications relating the relative performance of the communication system.

17. In a communication system for providing wireless voice and multimedia communications that includes a base station providing a bandwidth of wireless coverage within a service area to a plurality of wireless units operating within the service area, a method of operation comprising the steps of:

receiving bandwidth requirement requests from at least some of the plurality of wireless units, the bandwidth requirement requests including multimedia bandwidth requirements;

allocating the bandwidth among the plurality of mobile units based upon the bandwidth requirement requests, the bandwidth allocated among transmit multimedia communications, receive multimedia communications, transmit voice communications and receive voice communications;

segmenting outgoing multimedia communications for transmission to a wireless unit of the plurality of wireless units according to a respective allocated bandwidth;

transmitting the segmented multimedia communications to the wireless unit using the respective allocated bandwidth;

receiving the segmented multimedia communications at the wireless unit; and reconstructing the segmented multimedia communications at the wireless unit.

18. The method of claim 17, wherein the bandwidth includes a plurality of channels, each having a channel bandwidth, and the method includes the step of:

selectively allocating the channels in response to the bandwidth requirement requests to achieve a minimum transmission rate.

19. The method of claim 17, further comprising the step of allocating time divisions of the bandwidth to achieve a minimum transmission rate.

20. The method of claim 17, wherein the base station includes a plurality of cellular digital packet data modems with each of the cellular digital packet data modems providing a respective portion of the bandwidth, the method further comprising the step of:

selectively allocating the plurality of cellular digital packet data modems of the base station to achieve a minimum transmission rate.

21. The method of claim 20, wherein at least one of the wireless mobile units includes a plurality of cellular digital packet data modems, the method further comprising the step of:

selectively allocating the cellular digital packet data modems of the wireless mobile units to achieve a minimum transmission rate.

22. The method of claim 17, further comprising the step of providing a minimum bandwidth for voice communications.

23. The method of claim 17, further comprising the step of providing at least one grade of service, with each grade of service corresponding to a minimum transmission rate for multimedia communications within the communication system.

24. The method of claim 23, further comprising the step of providing multiple classes of service, each class of service associated with a respective grade of service.

25. The method of claim 17, further comprising the step of providing performance indications to a user, the performance indications relating the relative performance of the communication system.

26. A wireless unit for operation with a communication system that includes at least one base station that supports wireless multimedia communications within a corresponding cell, the wireless unit comprising:

terminal circuitry;

a radio frequency interface coupled to the terminal circuitry that is capable of wirelessly interfacing with the base station; and a multimedia interface unit coupled to the terminal circuitry and to the radio frequency interface, the multimedia interface comprising:

a bandwidth negotiation unit that interacts with the base station to obtain an assignment of an allocated bandwidth for transmit multimedia communications, receive multimedia communications, transmit voice communications and receive voice communications;

a multimedia communication segmentation unit that segments outgoing multimedia communications for transmission according to the allocated bandwidth; and a multimedia communication assembly unit that reconstructs incoming segmented multimedia communications according to the allocated bandwidth.

27. The wireless unit of claim 26, the bandwidth provided by a plurality of channels, each channel having a channel bandwidth, the plurality of the channels allocated in response to the multimedia communication requirements of a plurality of serviced wireless units operating within the corresponding service area to achieve a minimum transmission rate.

28. The wireless unit of claim 26, the bandwidth further allocated along time divisions of the plurality of channels to achieve a minimum transmission rate.

29. The wireless unit of claim 26, the wireless unit including a plurality of cellular digital packet data modems, each of the cellular digital packet data modems servicing a respective portion of the allocated bandwidth, the bandwidth negotiation unit selectively allocating the plurality of cellular digital packet data modems.

30. The wireless unit of claim 29, the bandwidth comprising a plurality of channels, each of which has a channel bandwidth, each of the plurality of digital packet data modems assigned to a respective channel.

31. The wireless unit of claim 26, the bandwidth negotiation unit obtaining sufficient bandwidth to achieve a minimum transmission rate for multimedia communications.

32. The wireless unit of claim 26, the bandwidth negotiation unit obtaining allocations of code divisions of the bandwidth responsive to multimedia communication requirements to achieve a minimum transmission rate.

33. The wireless unit of claim 26, the bandwidth negotiation unit obtaining allocations of time divisions of the bandwidth responsive to multimedia communication requirements to achieve a minimum transmission rate.

34. The wireless unit of claim 26, wherein the base station provides at least one grade of service for multimedia communications.

35. The wireless unit of claim 24, wherein the base station provides multiple classes of service, each class of service associated with a respective grade of service.

36. The wireless unit of claim 26, wherein the bandwidth allocation unit, the performance indications relating the relative performance of the communication system.

* * * * *

UNITED STATES PATENT AND TRADEMARK OFFICE
CERTIFICATE OF CORRECTION

PATENT NO.    : 6,097,733
DATED         : August 1, 2000
INVENTOR(S)   : Kalyan K. Basu and Carlos A. Molina It is certified that error appears in the above-identified patent and that said Letters Patent is hereby corrected as shown below:

Claim 3,
Lines 5-6, change "the minimum transmission rate" to -- a minimum transmission rate --.

Claim 6,
Line 3, change "the minimum transmission rate" to -- a minimum transmission rate --.

Claim 7,
Line 3, change "the minimum transmission rate" to -- a minimum transmission rate --.

Claim 10,
Line 2, change "bandwidth" to -- transmission rate --.

Claim 36,
Line 2, change ", the" to -- provides --.

Signed and Sealed this

Ninth Day of April, 2002

Attest:

JAMES E. ROGAN
Attesting Officer     Director of the United States Patent and Trademark Office